No. 862,995.  
PATENTED AUG. 13, 1907.

J. H. PHILLIPS, Jr.  
PIPE OR HOSE COUPLING.  
APPLICATION FILED NOV. 9, 1906.

Witnesses:

Inventor,
John Henry Phillips Jr.
By Chappell Earl
Att'ys

No. 862,995.

PATENTED AUG. 13, 1907.

J. H. PHILLIPS, Jr.
PIPE OR HOSE COUPLING.
APPLICATION FILED NOV. 9, 1906.

Witnesses:

Inventor,
John Henry Phillips Jr.
By Chappell Mears
Att'ys

No. 862,995. PATENTED AUG. 13, 1907.
J. H. PHILLIPS, Jr.
PIPE OR HOSE COUPLING.
APPLICATION FILED NOV. 9, 1906.

Witnesses:

Inventor,
John Henry Phillips Jr.
By Chappell Earl
Att'ys

UNITED STATES PATENT OFFICE.

JOHN HENRY PHILLIPS, JR., OF JACKSON, MICHIGAN.

PIPE OR HOSE COUPLING.

No. 862,995.  Specification of Letters Patent.  Patented Aug. 13, 1907.

Application filed November 9, 1906. Serial No. 342,702.

*To all whom it may concern:*

Be it known that I, JOHN HENRY PHILLIPS, Jr., a citizen of the United States, residing at the city of Jackson, county of Jackson, and State of Michigan, have invented certain new and useful Improvements in Pipe or Hose Couplings, of which the following is a specification.

This invention relates to improvements in pipe or hose couplings.

My improved pipe or hose coupling is particularly adapted, and, as shown in the accompanying drawing, is designed for use as a coupling for the steam and air pipes of railway trains, although it is applicable, and certain features thereof are very desirable, for use in various other relations.

The objects of this invention are,—first, to provide an improved coupling for the pipes of railway trains which is adapted to automatically couple or uncouple all of the pipes of a train, both steam and air, upon the coupling or uncoupling of the cars. Second, to provide an improved coupling for the pipes of railway trains in which a car having a combined or combination coupling may be readily coupled in series with a car or cars having individual or independent couplings for the steam and air pipes. Third, to provide an improved coupling for the pipes of railway trains which is adapted to be automatically coupled or uncoupled upon the coupling or uncoupling of the cars. Fourth, to provide a coupling for the steam and air pipes of railway trains by which the use of rubber or like flexible hose is dispensed with. Fifth, to provide an improved coupling in which the joint is very secure, and, at the same time, one which automatically separates upon the detaching of the coupling members. Sixth, to provide a hose or pipe coupling which is very durable in use, and, at the same time, one which is comparatively simple and economical in structure and convenient to use.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which,—

In the drawing, the sectional views are taken looking in the direction of the little arrows at the ends of the section lines, and similar reference characters refer to similar parts throughout the several views.

Referring to the drawing, 1—1 represent the frame of a railway car or other carrying frame for the couplings. On the under side of this frame is a longitudinal bar 2, from which the parts are supported. At the rear end of the bar 2 is a vertically arranged plate 3. This plate is braced from the bar 2 by suitable braces 4 arranged at each side. On this plate 3 is a socket 5 for the head or ball 7, forming a ball-and-socket joint for the train pipes 60 to the coupling pipes 6, there being three pipes illustrated. One of the pipes is the steam and the others are the air-brake and the air-whistle pipes of the train.

Figures 4, 11, 12:
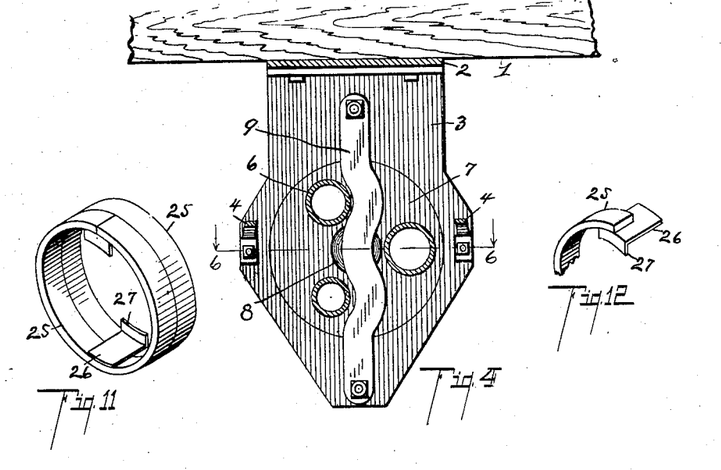
Fig. 4 is a vertical section taken on a line corresponding to the broken line 4—4 of Fig. 1.
Fig. 11 is an enlarged perspective of a pair of the packing rings 25.
Fig. 12 is a detail perspective of one of the packing rings.

The joint head 7 is provided with a spherical projection 8 on its front side, the same being centrally arranged, as clearly appears in Fig. 4. A retaining bar 9 is arranged to engage this projection, thereby retaining the head in the socket. This retaining bar is secured by bolts 10 to the plate 3. Spring washers 50 are provided so that the ball is yieldingly held in its socket.

Figure 1:
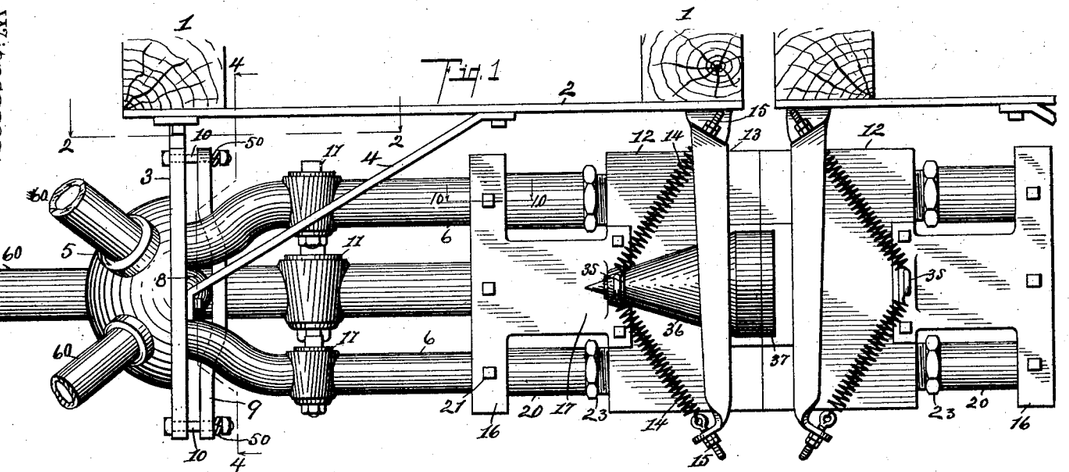
Figure 1 is a detail side elevation of my improved hose or pipe coupling, the same being shown adapted as a coupling for the steam and air pipes of railway trains.
Figure 6:
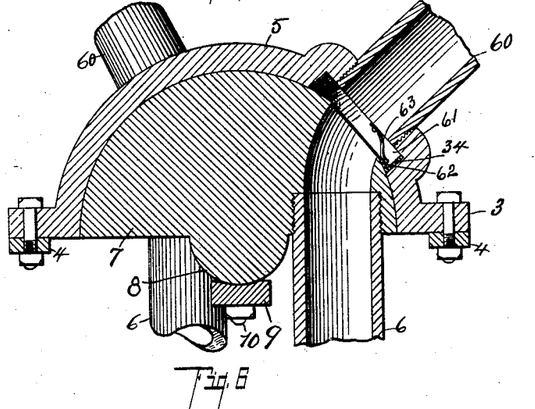
Fig. 6 is an enlarged horizontal section taken on a line corresponding to line 6—6 of Fig. 4.

The ball and socket are provided with suitable passages for the three pipes, as clearly appears in Figs. 1, 4 and 6. With the pipes thus joined, the coupling pipes are free to swing in any direction. The coupling pipes 6 are curved and arranged so that their forward ends lie in the same vertical plane. The coupling pipes 6 are provided with valves 11, so that they may be closed when desired, as would be necessary on the rear end of the rear car of a train.

The coupling head 12 is arranged to slide or telescope upon the forward ends of the coupling pipes 6. The coupling head is secured to the yoke-like frame 13 depending from the bar 2 by means of the springs 14. These springs are arranged to hold the head normally in a central position and also to hold it normally forward. The springs are connected to the frame 13 by means of the eye bolts 15, so that the tension of the springs can be regulated if desired. The heads 12 are provided with cylinder-like chambers 51 adapted to receive the plunger-like ends 22 of the pipes 6. To assist in supporting and guiding the head upon the pipes, a cross-piece 16 is provided therefor through which the pipes are arranged. This cross-piece is connected to the rear end of the head by arms 17. The cross-piece 16 is provided with suitable bushings 18 for the pipes.

The pipes 6 are provided with suitable packing rings 23 which are threaded into the heads. These packing rings are provided with annular projections 24 at their outer ends and the bushings 18 for the pipes are provided with corresponding projections 19 at their forward ends adapted to receive the tubular casings 20 which serve as shields to prevent clogging at this point. The plunger portions 22 of the pipes are provided with annular grooves at their inner ends adapted to receive the spring packing rings 25. These packing rings which are open at one point are formed of spring metal and are arranged to break joints, as clearly appears in Fig. 11. The joints in the rings are covered by the transversely arranged splice or lap pieces 26, one of which is carried by each of the rings 25 and arranged to project across the other ring. One end of these lap pieces 26 is preferably turned inwardly at 27, and arranged to bear against the side of the packing ring groove so that the steam or air cannot reach the joint in the ring. This secures, in effect, a continuous packing ring.

The head is provided with a plurality of cylindrical chambers 52 opening into the chambers 51. In these chambers 52 are arranged the coupling members 28. These coupling members are preferably cylindrical in form and are provided with inturned flange-like lips 29 at their outer ends. The coupling members 28 are adapted to reciprocate in the chambers 52 and are held therein by the fingers 31. These fingers are secured to the coupling members and their inner ends are formed into hooks arranged to engage in the annular grooves 32. This gives the coupling members a limited reciprocating movement within the heads.

Figure 8:
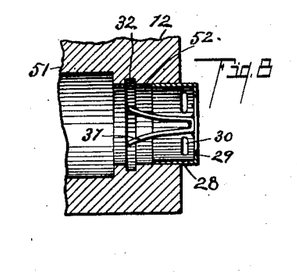
Fig. 8 is an enlarged detail section, showing one of the coupling members in its outer position, the parts thereof being open.
Figure 9:
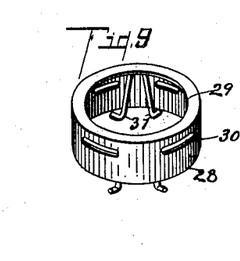
Fig. 9 is a perspective of one of the coupling members removed from the head.
Figure 10:
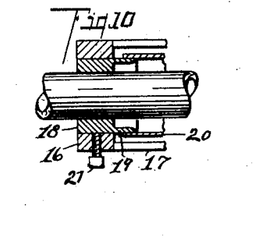
Fig. 10 is a detail section, showing details of the coupling heads.

In operation, the lips 29 of the coupling members are in contact. The pressure of the steam on the inside of the lips tends to hold them together. In order to relieve the steam pressure on the lips in breaking the coupling, ports 30 are provided in the sides of the coupling members, as clearly appears in Figs. 8 and 9. In uncoupling, the coupling members 28 are drawn outwardly, as the coupling heads are drawn apart until these ports are opened. This relieves the steam pressure so that the lips of the coupling members will readily separate.

Figure 5:
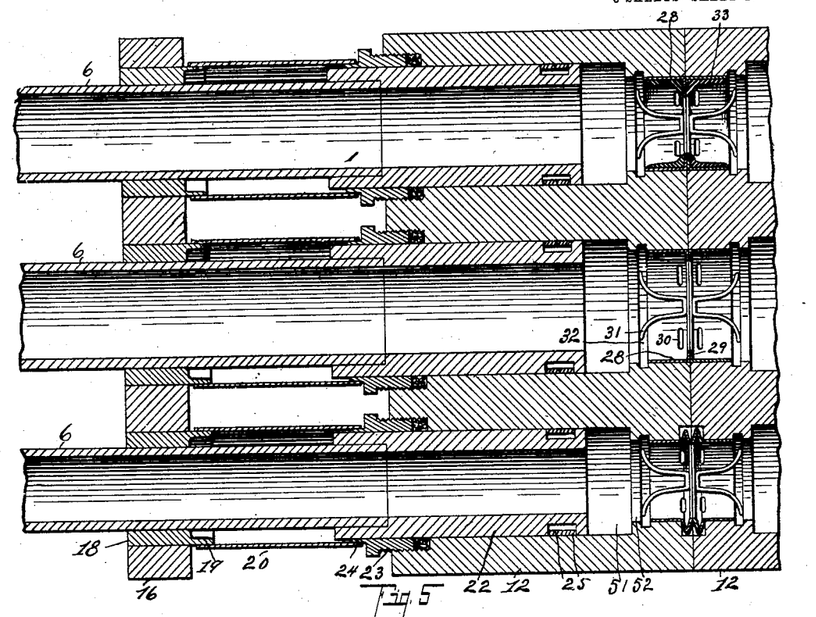
Fig. 5 is an enlarged detail vertical section taken on a line corresponding to line 5—5 of Fig. 2 through the coupling heads showing the relation thereof when joined and the arrangement of the coupling members.

The coupling member 28 at the top of Fig. 5 is provided with a flexible lining 33 the same being preferably rubber and overlapping the edges of the lips 29, the object being to insure a perfect joint. It is believed, however, that under ordinary conditions, this lining is unnecessary and may be omitted, as is shown in the middle coupling member 28 in Fig. 5. The bottom coupling member in Fig. 5 is shown slightly modified, the lips being V-shaped and fitting together under spring pressure. The pressure of the steam also acts to hold these lips together, the same as in the other forms shown.

In the ball-and-socket joint for the pipe sections 6 and 60, the socket members 5 are provided with packing ring chambers 61 adapted to receive the packing rings 34. These packing rings are fitted into the chambers and are provided with flanges 62 adapted to bear on the ball member, the packing rings being somewhat V-shaped in cross section. These flanges 62 are flexible and are held against the ball member by the pressure of the steam. To insure contact when the steam is turned on springs 63 are provided.

The coupler heads 12 are each provided with a conical socket 36 at one side and a forwardly projecting conical guide 37 at the other side, whereby the heads are guided together and centered to bring the couplings into proper relation. These guides, co-acting with the springs which hold the heads normally centered, serve to automatically guide the heads into proper relation to bring the coupling members together.

As the coupling members of each head are arranged in a vertical series, they are always in proper relation to connect the proper pipes. The springs 14 are, as stated, arranged to hold the heads normally forward; see Fig. 1. In addition to this, the pressure of the steam and air in the heads also serves to hold them together.

Figures 2, 7, 13:
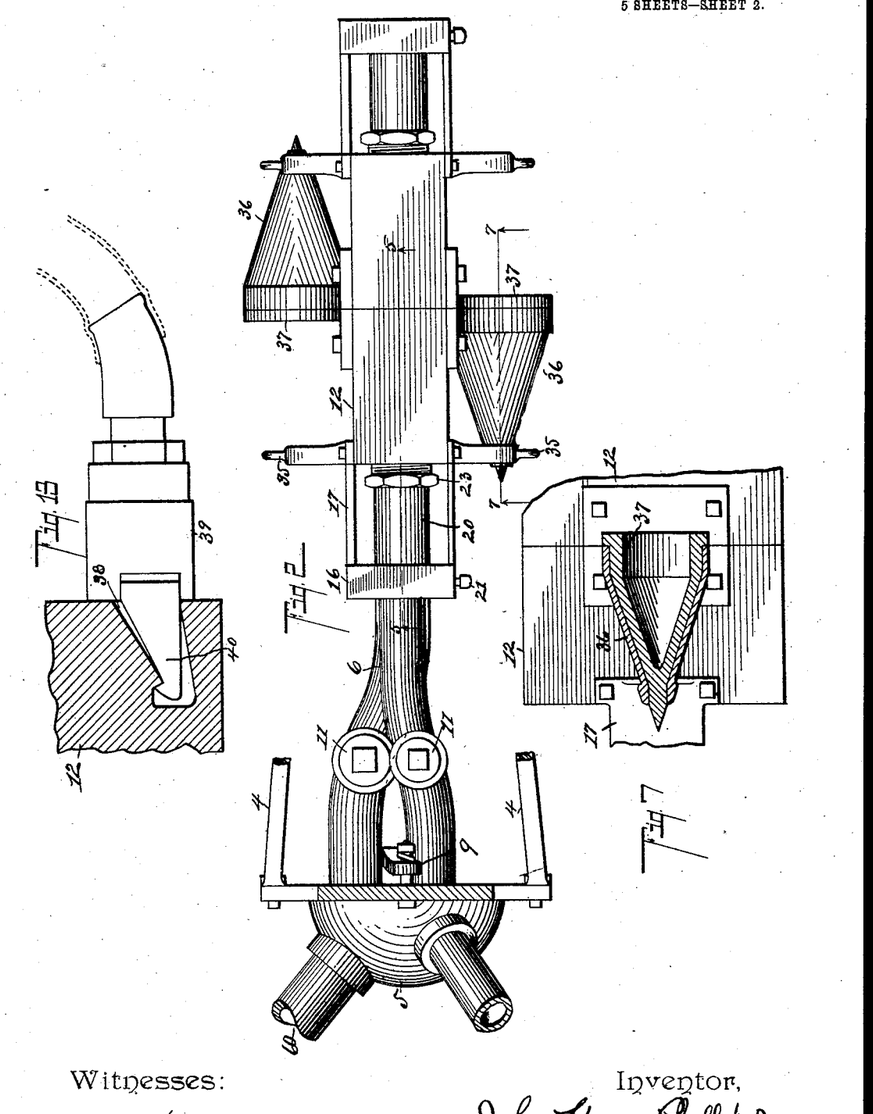
Fig. 2 is a detail horizontal section, taken on a line corresponding to line 2—2 of Fig. 1.
Fig. 7 is a detail vertical section taken on a line corresponding to line 7—7 of Fig. 2, showing the arrangement of the guide members of the coupling heads.
Fig. 13 is an enlarged detail section taken on a line corresponding to line 13—13 of Fig. 3, showing an individual or single coupling head attached to one of the combination coupling heads 12.
Figure 3:
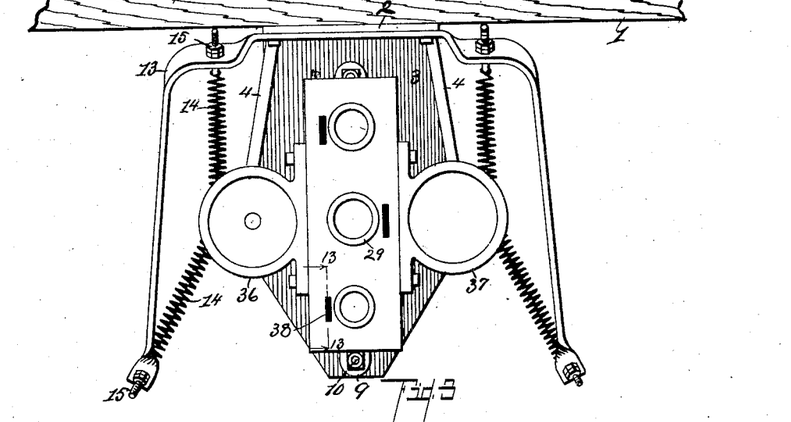
Fig. 3 is a front elevation of one of the combination coupling heads.
Figure 14:
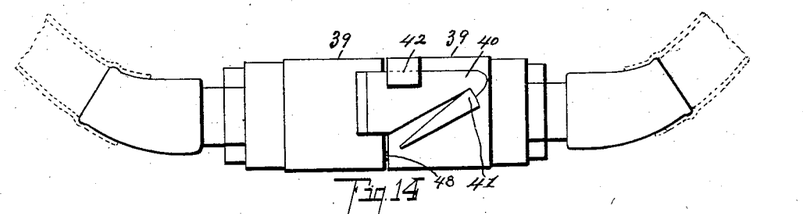
Fig. 14 is a side elevation of a pair of individual or single couplings attached.
Figure 15:
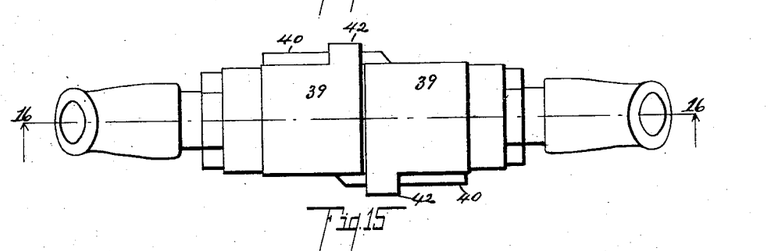
Fig. 15 is a plan view of the structure shown in Fig. 14.
Figure 16:
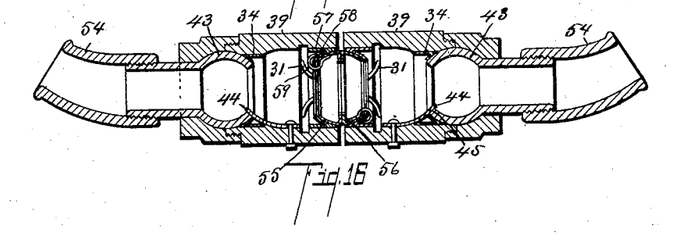
Fig. 16 is a longitudinal section taken on a line corresponding to line 16—16 of Fig. 15.
Figure 17:
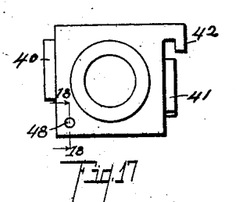
Fig. 17 is an end elevation of one of the individual couplings.
Figure 18:
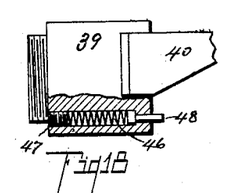
Fig. 18 is a detail side elevation, partly in section, taken on a line corresponding to line 18—18 of Fig. 17, showing the arrangement of the springs 46 for holding the latches of the individual coupling heads in engagement.
Figure 19:
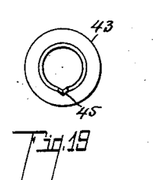
Fig. 19 is an end elevation of the ball member 43 of the swivel of one of the individual coupling heads.

As it is liable to occur in practice that a portion of the cars of a train be equipped with the combination couplings described and a portion with individual coupling members, I adapt the combination coupler to be used in connection with individual couplings. This is accomplished by forming latch sockets 38 (see Figs. 3 and 13) adapted to receive the latches 40 of the individual couplers; see Figs. 13, 14 and 15 in the combination coupling heads. The individual or single coupling heads 39 are provided with latches 40 at one side and with inclined catches or stops on the other side, over which the latch of the opposite member is adapted to engage, the hook-like guard 42 engaging over the top of the latch when in position; see Fig. 14. With this arrangement, the heads are easily guided into position and secured together. When it is desired to uncouple the members, they are tilted rearwardly from each other, which allows the hook of the latch to be disengaged from the stop. When the individual couplings are connected in individual pairs, as shown in Figs. 14 15 and 16, the latches 40 face downwardly. When connected to the combination coupling heads, they are inverted. To permit this turning, the hose nipples 54 are swiveled in the coupling heads, the nipples being provided with ball members 43 arranged in suitable sockets in the coupling heads. This swivel joint is provided with packing rings 34 corresponding to the packing rings for the joints of the pipe sections 6 and 60 described. In order to prevent the accidental turning of the heads upon these swivel joints, springs 44, adapted to engage notches 45 in the ends of the swivel members 43, are provided; see Figs. 16 and 19. While these springs normally hold the parts in a fixed relation, they permit of the heads being turned upon the swivels when desired. The nipples 45 are turned upwardly so that the weight of the heads tends to keep them in proper relation and in an upright position. The latches 40 are held in engagement with the stops therefor by springs 46. These are preferably arranged in suitable chambers formed in the coupler heads and hold the pins 48 normally outward to engage the end of the opposite head. The springs are preferably held in the chambers and their tension adjusted by the screw plug 47; see Figs. 17 and 18. The latches in these couplers being above the point of spring pressure the tendency of the pressure is to hold them together, the spring being mainly designed to hold them together until the steam or air pressure is turned on.

The coupling members of the individual coupling 53 are preferably semi-spherical in form and are carried by the cylinders 57 which are adjustably retained within the heads of the hooked fingers 31, as has been described for the coupling members 28. These cylinders 57 are provided with sockets 58 into which the coupling members 55 are fitted. These sockets are preferably formed of thin metal and project from the cylinders at an angle thereto so that the steam pressure may act thereon to form a tight joint, as has been described for the packing rings.

The coupling members are retained within the sockets by springs 59 which engage over the edges thereof. The lips of the coupling members in use fit together as has been described.

I have illustrated and described my improved coupling in detail in the form preferred by me on account of its structural simplicity and economy and convenience in use. I am, however, aware that it is capable of very great variation in structural details without departing from my invention, and I desire to be understood as claiming the same specifically, as illustrated, as well as broadly.

Having thus described my invention, what I claim as new and desire to secure by Letters Patent is:

1. In a structure of the class described, the combination with a supporting frame of a plurality of pipes to be coupled; a plurality of coupling pipes; a fixed socket member to which said pipes to be coupled are connected; a ball member to which said coupling pipes are connected arranged in said socket; a centrally arranged spherical projection on the front side of said ball member; a bar arranged to engage said projection for holding said ball member in said socket; means for supporting said bar under spring tension; a coupling head having a plurality of cylinders formed therein; cylindrical plunger-like heads on the outer ends of said coupling pipes arranged in said cylinders in said coupling head; cylindrical coupling members having inturned flange-like lips at their outer ends and ports in their side walls arranged to be opened when said coupling members are in their outer position and closed when in their inner position, adjustably arranged in a vertical series in said coupling head; springs adapted to hold said head normally forward and in a central position; and a conical socket at one side of said head and a forwardly projecting conical guide at the other, for the purpose specified.

2. In a structure of the class described, the combination with a supporting frame, of a plurality of pipes to be coupled; a plurality of coupling pipes; a fixed socket to which said pipes to be coupled are connected; a ball member to which said coupling pipes are connected arranged in said socket; a coupling head having a plurality of cylinders formed therein; cylindrical plunger-like heads on the outer ends of said coupling pipes arranged in said cylinders in said coupling head; cylindrical coupling members having inturned flange-like lips at their outer ends and ports in their side walls arranged to be opened when said coupling members are in their outer position and closed when in their inner position, adjustably arranged in a vertical series in said coupling head; springs adapted to hold said head normally forward and in a central position; and a conical socket at one side of said head and a forwardly projecting conical guide at the other, for the purpose specified.

3. In a structure of the class described, the combination with a supporting frame, of a plurality of pipes to be coupled; a plurality of coupling pipes; a fixed socket member to which said pipes to be coupled are connected; a ball member to which said coupling pipes are connected arranged in said socket; a centrally arranged spherical projection on the front side of said ball member; a bar arranged to engage said projection for holding said ball member in said socket; means for supporting said bar under spring tension; a coupling head having a plurality of cylinders formed therein; cylindrical plunger-like heads on the outer ends of said coupling pipes arranged in said cylinders in said coupling head; cylindrical coupling members having inturned flange-like lips at their outer ends and ports in their side walls arranged to be opened when said coupling members are in their outer position and closed when in their inner position, adjustably arranged in a vertical series in said coupling head; and springs adapted to hold said head normally forward and in a central position, for the purpose specified.

4. In a structure of the class described, the combination with a supporting frame, of a plurality of pipes to be coupled; a plurality of coupling pipes; a fixed socket member to which said pipes to be coupled are connected; a ball member to which said coupling pipes are connected arranged in said socket; a coupling head for supporting said bar under spring tension; a coupling head having a plurality of cylinders formed therein; cylindrical plunger-like heads on the outer ends of said coupling pipes arranged in said cylinders in said coupling head; cylindrical coupling members having inturned flange-like lips at their outer ends and ports in their side walls arranged to be opened when said coupling members are in their outer position and closed when in their inner position, adjustably arranged in a vertical series in said coupling head; and springs adapted to hold said head normally forward and in a central position, for the purpose specified.

5. In a structure of the class described, the combination with a supporting frame, of a plurality of pipes to be coupled; a plurality of coupling pipes; a fixed socket member to which said pipes to be coupled are connected; a ball member to which said coupling pipes are connected arranged in said socket; a centrally arranged spherical projection on the front side of said ball member; a bar arranged to engage said projection for holding said ball member in said socket; means for supporting said bar under spring tension; a coupling head having a plurality of cylinders formed therein; cylindrical plunger-like heads on the outer ends of said coupling pipes arranged in said cylinders in said coupling head; coupling members arranged in a vertical series in said coupling head; springs adapted to hold said head normally forward and in a central position; and a conical socket at one side of said head and a forwardly projecting conical guide at the other, for the purpose specified.

6. In a structure of the class described, the combination with a supporting frame, of a plurality of pipes to be coupled; a plurality of coupling pipes; a fixed socket member to which said pipes to be coupled are connected; a ball member to which said coupling pipes are connected arranged in said socket; a coupling head having a plurality of cylinders formed therein; cylindrical plunger-like heads on the outer ends of said coupling pipes arranged in said cylinders in said coupling head; coupling members arranged in a vertical series in said coupling head; springs adapted to hold said head normally forward and in a central position; and a conical socket at one side of said head and a forwardly projecting conical guide at the other, for the purpose specified.

7. In a structure of the class described, the combination with a supporting frame, of a plurality of pipes to be coupled; a plurality of coupling pipes; a fixed socket to which said pipes to be coupled are connected; a ball member to which said coupling pipes are connected arranged in said socket; a centrally arranged spherical projection on the front side of said ball member; a bar arranged to engage said projection for holding said ball member in said socket; means for supporting said bar under spring tension; a coupling head having a plurality of cylinders formed therein; cylindrical plunger-like heads on the outer ends of said coupling pipes arranged in said cylinders in said couplings; coupling members arranged in a vertical series in said coupling head; and springs adapted to hold said head normally forward and in a central position, for the purpose specified.

8. In a structure of the class described, the combination with a supporting frame, of a plurality of pipes to be coupled; a plurality of coupling pipes; a fixed socket member to which said pipes to be coupled are connected; a ball member to which said coupling pipes are connected arranged in said socket; a coupling head having a plurality of cylinders formed therein; cylindrical plunger-like heads on the outer ends of said coupling pipes arranged in said cylinders in said coupling head; coupling members arranged in a vertical series in said coupling head; and springs adapted to hold said head normally forward and in a central position, for the purpose specified.

9. In a structure of the class described, the combination with a supporting frame of a plurality of pipes to be coupled; a plurality of coupling pipes; a fixed joint member to which said pipes to be coupled are connected; a joint member to which said coupling pipes are connected; a coupling head adjustably arranged on said coupling pipes; cylindrical coupling members having inturned flange-like lips at their outer ends and ports arranged to be opened when said coupling members are in their outer position and closed when in their inner position, adjustably arranged in vertical series in said coupling head; springs adapted to hold said head normally forward and in a central position; and a conical socket at one side of said head and a forwardly projecting conical guide at the other, for the purpose specified.

10. In a structure of the class described, the combination with a supporting frame, of a plurality of pipes to be coupled; a plurality of coupling pipes; a fixed joint member to which said pipes to be coupled are connected; a joint member to which said coupling pipes are connected; a coupling head adjustably arranged on said coupling pipes; cylindrical coupling members having inturned flange-like lips at their outer ends and ports arranged to be opened when said coupling members are in their outer position and closed when in their inner position, adjustably arranged in vertical series in said coupling head; and a conical socket at one side of said head and a forwardly projecting conical guide at the other, for the purpose specified.

11. In a structure of the class described, the combination with a supporting frame of a plurality of pipes to be coupled; a fixed joint member to which said pipes to be coupled are connected; a joint member to which said coupling pipes are connected; a coupling head adjustably arranged on said coupling pipes; cylindrical coupling members having inturned flange-like lips at their outer ends and ports arranged to be opened when said coupling members are in their inner position, adjustably arranged in vertical series in said coupling head; and springs adapted to hold said head normally forward and in a central position, for the purpose specified.

12. In a structure of the class described, the combination with a supporting frame, of a plurality of pipes to be coupled; a plurality of coupling pipes; a fixed joint member to which said pipes to be coupled are connected; a joint member to which said coupling pipes are connected; a coupling head adjustably arranged on said coupling pipes; cylindrical coupling members having inturned flange-like lips at their outer ends and ports arranged to be opened when said coupling members are in their outer position and closed when in their inner position, adjustably arranged in vertical series in said coupling head; for the purpose specified.

13. In a structure of the class described, the combination with a supporting frame, of a plurality of pipes to be coupled; a plurality of coupling pipes; a fixed joint member to which said pipes to be coupled are connected; a joint member to which said coupling pipes are connected; a coupling head adjustably arranged on said coupling pipes; coupling members arranged in vertical series in said coupling head; springs adapted to hold said head normally forward and in a central position; and a conical socket at one side of said head and a forwardly projecting conical guide at the other, for the purpose specified.

14. In a structure of the class described, the combination with a supporting frame, of a plurality of pipes to be coupled; a plurality of coupling pipes; a fixed joint member to which said pipes to be coupled are connected; a joint member to which said coupling pipes are connected; a coupling head adjustably arranged on said coupling pipes; coupling members arranged in vertical series in said coupling head; and a conical socket at one side of said head and a forwardly projecting conical guide at the other, for the purpose specified.

15. In a structure of the class described, the combination with a supporting frame, of a plurality of pipes to be coupled; a plurality of coupling pipes; a fixed joint member to which said pipes to be coupled are connected; a joint member to which said coupling pipes are connected; a coupling head adjustably arranged on said coupling pipes; coupling members arranged in vertical series in said coupling head; and springs adapted to hold said head normally forward and in a central position, for the purpose specified.

16. In a structure of the class described, the combination with a supporting frame, of a plurality of pipes to be coupled; a plurality of coupling pipes; a fixed joint member to which said pipes to be coupled are connected; a joint member to which said coupling pipes are connected; a coupling head adjustably arranged on said coupling pipes; coupling members arranged in vertical series in said coupling head, for the purpose specified.

17. In a structure of the class described, the combination with a plurality of pipes to be coupled, of a coupling head; cylindrical coupling members having inturned flange-like lips at their outer ends and ports in their side walls arranged to be opened when said coupling members are in their outer position and closed when in their inner position, adjustably arranged in vertical series in said coupling head; and means for limiting the movement of said coupling members in said head, for the purpose specified.

18. In a structure of the class described, the combination with a plurality of pipes to be coupled, of a coupling head; and cylindrical coupling members having inturned flange-like lips at their outer ends and ports in their side walls arranged to be opened when said coupling members are in their outer position and closed when in their inner position, adjustably arranged in vertical series in said coupling head, for the purpose specified.

19. In a structure of the class described, the combination with a plurality of pipes to be coupled, of a coupling head; adjustable coupling members arranged in vertical series in said coupling head having ports therein adapted to be opened when the said coupling members are in their outer position; and means for limiting the movement of said coupling members in said head, for the purpose specified.

20. In a structure of the class described, the combination with a plurality of pipes to be coupled, of a coupling head; and adjustable coupling members arranged in vertical series in said coupling head having ports therein adapted to be opened when the said coupling members are in their outer position, for the purpose specified.

21. In a structure of the class described, the combination with a plurality of pipes to be coupled, of a coupling head; cylindrical coupling members having inturned flange-like lips at their outer ends and ports arranged to be opened when said coupling members are in their outer position and closed when in their inner position, adjustably arranged in vertical series in said coupling head; and means for limiting the movement of said coupling members in said head, for the purpose specified.

22. In a structure of the class described, the combination with a plurality of pipes to be coupled, of a coupling head; and cylindrical coupling members having inturned flange-like lips at their outer ends and ports arranged to be opened when said coupling members are in their outer position and closed when in their inner position, adjustably arranged in vertical series in said coupling head, for the purpose specified.

23. In a structure of the class described, the combination with a pipe to be coupled, of a coupling pipe; a fixed joint member to which said pipe to be coupled is connected; a joint member to which said coupling pipe is connected; a coupling head adjustably arranged on said coupling pipe; a cylindrical coupling member having an inturned flange-like lip at its outer end and a port in its side wall arranged to be opened when said coupling member is in its outer position and closed when in its inner position adjustably arranged in said coupling head; springs adapted to hold said head normally forward and in a central position; and a conical socket at one side of said head and a forwardly projecting conical guide at the other, for the purpose specified.

24. In a structure of the class described, the combination with a pipe to be coupled, of a coupling pipe; a fixed joint member to which said pipe to be coupled is connected; a joint member to which said coupling pipe is connected; a coupling head adjustably arranged on said coupling pipe; a cylindrical coupling member having an inturned flange-like lip at its outer end and a port in its side wall arranged to be opened when said coupling member is in its outer position and closed when in its inner position adjustably arranged in said coupling head; and springs adapted to hold said head normally forward and in a central position, for the purpose specified.

25. In a structure of the class described, the combination with a pipe to be coupled, of a coupling pipe; a fixed joint member to which said pipe to be coupled is connected; a joint member to which said coupling pipe is connected; a coupling head adjustably arranged on said coupling pipe; a cylindrical coupling member having an inturned flange-like lip at its outer end and a port in its side wall arranged to be opened when said coupling member is in its outer position and closed when in its inner position adjustably arranged in said coupling head; and a conical socket at one side of said head and a forwardly projecting conical guide at the other, for the purpose specified.

26. In a structure of the class described, the combination with a pipe to be coupled, of a coupling pipe; a fixed joint member to which said pipe to be coupled is connected; a joint member to which said coupling pipe is connected; a coupling head adjustably arranged on said coupling pipe; and a cylindrical coupling member having an inturned flange-like lip at its outer end and a port in its side wall arranged to be opened when said coupling member is in its outer position and closed when in its inner position adjustably arranged in said coupling head, for the purpose specified.

27. In a structure of the class described, the combination with a pipe to be coupled, of a coupling pipe; a fixed joint member to which said pipe to be coupled is connected; a joint member to which said coupling pipe is connected; a coupling head adjustably arranged on said coupling pipe; springs adapted to hold said head normally forward and in a central position; and a conical socket at one side of said head and a forwardly projecting conical guide at the other, for the purpose specified.

28. In a structure of the class described, the combination with a pipe to be coupled, of a coupling pipe; a fixed joint member to which said pipe to be coupled is connected; a joint member to which said coupling pipe is connected; a coupling head adjustably arranged on said coupling pipe; and springs adapted to hold said head normally forward and in a central position, for the purpose specified.

29. In a structure of the class described, the combination with the pipes to be coupled, a pair of coupling members each comprising a coupling pipe; a fixed joint member to which the pipe to be coupled is connected; a joint member to which said coupling pipe is connected; a coupling head adjustably arranged on said coupling pipe; and a conical socket at one side of said head and a forwardly projecting conical guide at the other, for the purpose specified.

30. In a structure of the class described, the combination with the coupling heads each having a coupling member adjustably arranged therein, said coupling member being provided with an inturned flange-like lip at its outer end and a port in its side wall arranged to be opened when said coupling member is in its outer position and closed when in its inner position; and means for limiting the movement of said coupling members in said heads, for the purpose specified.

31. In a structure of the class described, the combination with the coupling heads each having a coupling member adjustably arranged therein, said coupling member being provided with an inturned flange-like lip at its outer end and a port arranged to be opened when said coupling member is in its outer position and closed when in its inner position; and means for limiting the movement of said coupling members in said heads, for the purpose specified.

32. In a structure of the class described, the combination with the coupling heads each having a coupling member adjustably arranged therein, said coupling member being provided with an inturned flange-like lip at its outer end; and means for limiting the movement of said coupling members in said heads, for the purpose specified.

33. In a structure of the class described, the combination with the coupling heads each having a coupling member adjustably arranged therein, said coupling member being provided with an inturned flange-like lip at its outer end and a port in its side wall arranged to be opened when said coupling member is in its outer position and closed when in its inner position, for the purpose specified.

34. In a structure of the class described, the combination with the coupling heads each having a coupling member adjustably arranged therein, said coupling member being provided with an inturned flange-like lip at its outer end and a port arranged to be opened when said coupling member is in its outer position and closed when in its inner position, for the purpose specified.

35. In a structure of the class described, the combination with the coupling heads each having a coupling member adjustably arranged therein, said coupling member being provided with an inturned flange-like lip at its outer end, for the purpose specified.

36. In a structure of the class described, the combination with the coupling heads each having a coupling member adjustably arranged therein, said coupling member being provided with a port in its side wall arranged to be opened when said coupling member is in its outer position and closed when in its inner position; and means for limiting the movement of said coupling member in said heads, for the purpose specified.

37. In a structure of the class described, the combination with the coupling heads each having a coupling member adjustably arranged therein, said coupling member being provided with a port arranged to be opened when said coupling member is in its outer position and closed when in its inner position; and means for limiting the movement of said coupling members, for the purpose specified.

38. In a structure of the class described, the combination with the coupling heads each having a coupling member adjustably arranged therein, said coupling member being provided with a port in its side wall arranged to be opened when said coupling member is in its outer position and closed when in its inner position, for the purpose specified.

39. In a structure of the class described, the combination with the coupling heads each having a coupling member adjustably arranged therein, said coupling member being provided with a port arranged to be opened when said coupling member is in its outer position and closed when in its inner position, for the purpose specified.

40. In a structure of the class described, the combination with the coupling heads each having a coupling member provided with an inturned flange-like lip at its outer end, for the purpose specified.

41. In a structure of the class described, the combination with a suitable frame, of a pipe to be coupled; a coupling pipe connected thereto by a flexible joint; a coupling head adjustably arranged on said coupling pipe; springs adapted to hold said head normally forward and in a central position; and a conical socket at one side of said head and a forwardly projecting conical guide at the other, for the purpose specified.

42. In a structure of the class described, the combination with a suitable frame, of a pipe to be coupled; a coupling pipe connected thereto by a flexible joint; a coupling head adjustably arranged on said coupling pipe; springs adapted to hold said head normally forward; and a conical socket at one side of said head and a forwardly projecting conical guide at the other, for the purpose specified.

43. In a structure of the class described, the combination with a suitable frame, of a pipe to be coupled; a coupling pipe connected thereto by a flexible joint; a coupling head adjustably arranged on said coupling pipe; and springs adapted to hold said head normally forward and in a central position, for the purpose specified.

44. In a structure of the class described, the combination with a suitable frame, of a pipe to be coupled; a coupling pipe connected thereto by a flexible joint; a coupling head adjustably arranged on said coupling pipe; and springs adapted to hold said head normally forward, for the purpose specified.

45. In a structure of the class described, the combination with a suitable frame, of a pipe to be coupled; a coupling pipe connected thereto by a flexible joint; a coupling head adjustably arranged on said coupling pipe; and a conical socket at one side of said head and a forwardly projecting conical guide at the other, for the purpose specified.

46. In a structure of the class described, the combination with a suitable frame, of a pipe to be coupled; a coupling pipe connected thereto by a flexible joint; a coupling head adjustably arranged on said coupling pipe; for the purpose specified.

47. In a structure of the class described, the combination with the supporting frame, of a plurality of pipes to be coupled; a plurality of coupling pipes; a fixed joint member to which said pipes to be coupled are connected; a movable joint member to which said pipe coupling members are connected; and a coupling head arranged on the outer ends of said coupling pipes.

48. In a structure of the class described, the combination with a plurality of pipes to be coupled, of a plurality of coupling pipes; a socket joint member; a ball joint member to which said coupling pipes are connected arranged in said socket; and a plurality of packing rings having inwardly projecting flanges arranged in said socket member so that said flanges bear against said ball member.

49. In a structure of the class described, the combination with a coupling head, of a plurality of coupling members carried thereby, said head having latch sockets arranged in proximity to said coupling members; and coupling heads having rigid latches adapted to be engaged in said sockets, for the purpose specified.

50. The combination of a pair of spring packing rings opening at one side, said rings being arranged edge to edge to break joints; and transversely arranged joint lap pieces secured to said rings at one side of the joint thereof and arranged to overlap the other ring of said joint pieces having their ends turned inwardly, for the purpose specified.

51. The combination of a pair of spring packing rings opening at one side, said rings being arranged edge to edge to break joint; and transversely arranged joint lap pieces secured to said rings at one side of the joint thereof and arranged to overlap the other ring, for the purpose specified.

In witness whereof, I have hereunto set my hand and seal in the presence of two witnesses.

JOHN HENRY PHILLIPS, Jr. [L. S.]

Witnesses:
D. J. WILLSON,
A. M. BAKER.